United States Patent
Elmer et al.

(10) Patent No.: US 8,386,755 B2
(45) Date of Patent: Feb. 26, 2013

(54) NON-ATOMIC SCHEDULING OF MICRO-OPERATIONS TO PERFORM ROUND INSTRUCTION

(75) Inventors: Tom Elmer, Austin, TX (US); Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 548 days.

(21) Appl. No.: 12/783,769

(22) Filed: May 20, 2010

(65) Prior Publication Data

US 2011/0029760 A1  Feb. 3, 2011

Related U.S. Application Data

(60) Provisional application No. 61/229,040, filed on Jul. 28, 2009.

(51) Int. Cl.
- *G06F 7/38* (2006.01)
- *G06F 9/00* (2006.01)
- *G06F 9/44* (2006.01)
- *G06F 15/00* (2006.01)

(52) U.S. Cl. .................................................. 712/222

(58) Field of Classification Search .................. None
See application file for complete search history.

(56) References Cited

U.S. PATENT DOCUMENTS

| 7,689,641 B2 * | 3/2010 | Abel et al. ............... 708/620 |
| 2004/0267857 A1 * | 12/2004 | Abel et al. ............... 708/524 |
| 2005/0125476 A1 * | 6/2005 | Symes et al. ............. 708/524 |
| 2007/0038693 A1 * | 2/2007 | Jacobi et al. ............. 708/446 |

\* cited by examiner

*Primary Examiner* — Corey S Faherty

(74) *Attorney, Agent, or Firm* — E. Alan Davis; James W. Huffman

(57) ABSTRACT

A microprocessor executes an instruction specifying a floating-point input operand having a predetermined size and that instructs the microprocessor to round the floating-point input operand to an integer value using a rounding mode and to return a floating-point result having the same predetermined size. An instruction translator translates the instruction into first and second microinstructions. An execution unit executes the first and second microinstructions. The first microinstruction receives as an input operand the instruction floating-point input operand and generates an intermediate result from the input operand. The second microinstruction receives as an input operand the intermediate result of the first microinstruction and generates the floating-point result of the instruction from the intermediate result. The intermediate result is the same predetermined size as the instruction floating-point input operand. The microprocessor executes the first and second microinstructions such that the commencement of their executions may have indeterminate separation in time.

47 Claims, 9 Drawing Sheets

FIG. 2
FORMAT OF DATA TRANSFERRED FROM XROUND1 TO XROUND2

| X | Y | Z |
|---|---|---|
| 202 | 204 | 206 |
| (1 BIT) | (8 BITS SP; 11 BITS DP) | (23 BITS SP; 52 BITS DP) |

NON-ATOMIC SCHEDULING OF MICRO-OPERATIONS TO PERFORM ROUND INSTRUCTION

CROSS REFERENCE TO RELATED APPLICATION(S)

This application claims priority based on U.S. Provisional Application Ser. No. 61/229,040, filed Jul. 28, 2009, entitled NON-ATOMIC SCHEDULING OF MICRO OPERATIONS TO PERFORM SSE 4.1 ROUND INSTRUCTION, which is hereby incorporated by reference in its entirety.

FIELD OF THE INVENTION

The present invention relates in general to the field of floating point arithmetic in a microprocessor, and particularly to execution of a floating point round instruction.

BACKGROUND OF THE INVENTION

Intel added a new set of related SSE instructions to their instruction set: ROUNDPD, ROUNDPS, ROUNDSD, and ROUNDSS, referred to collectively here as the ROUND instruction. The ROUND instruction rounds a floating point input value to an integer value and then returns the integer result as a floating point value. The rounding during the conversion from a floating point value to an integer value is performed based on a rounding control, or rounding mode.

These separate conversions from floating point to integer and conversion from integer to floating point operations are well understood in practice. The first operation requires locating an integer least significant bit (LSB) and binary round point within the source data value (with critical delay thru a right shifter) followed by conditional increment of a non-fractional value. The second operation potentially requires leading-zero enumeration followed by a normalization shift left and appropriate exponent calculation. It is necessary to decide how these two operations will be provided on a target floating point hardware design.

Prior multi-cycle or high latency designs provide the required capabilities in sequential circuit connections, first performing a right alignment shift, next a conditional round-increment, next leading zero enumeration, and finally a conditional normalization left shift. Significantly, if provided as maximally utilized rather than special purpose hardware, this approach penalizes any calculation not requiring some portion of the sequential connection with its intrinsic delay. If provided as special purpose hardware, this approach would consume valuable die space. These approaches are undesirable in a high performance microprocessor with emphasis on maximal utilization of circuit elements.

Other low latency floating point designs attempt separation of constituent circuit elements into minimal groups required for classes of calculation, such as near versus far calculations. The specific characteristics of each class allow reduction of total latency per calculation by eliminating unnecessary circuit components. For example, near subtract calculations may have trivial right alignment requirements. These types of design may afford the capabilities required for the new ROUND with a temporally sequential approach, namely, by scheduling the convert to integer using one group and the subsequent convert to floating point using a separate group.

BRIEF SUMMARY OF INVENTION

In one aspect the present invention provides a microprocessor configured to execute an instruction, the instruction specifying a floating-point input operand having a predetermined size, wherein the instruction instructs the microprocessor to round the floating-point input operand to an integer value using a rounding mode and return a floating-point result having the same predetermined size as the input operand. The microprocessor includes an instruction translator, configured to translate the instruction into first and second microinstructions. The microprocessor also includes an execution unit, configured to execute the first and second microinstructions. The first microinstruction receives as an input operand the instruction floating-point input operand and generates an intermediate result from the instruction input operand. The second microinstruction receives as an input operand the intermediate result of the first microinstruction and generates the floating-point result of the instruction from the intermediate result. The intermediate result is the same predetermined size as the instruction floating-point input operand.

In another aspect, the present invention provides a microprocessor configured to execute an instruction, the instruction specifying a floating-point input operand having a predetermined size, wherein the instruction instructs the microprocessor to round the floating-point input operand to an integer value using a rounding mode and return a floating-point result having the same predetermined size as the input operand. The microprocessor includes an instruction translator, configured to translate the instruction into first and second microinstructions. The microprocessor also includes an execution unit, configured to execute the first and second microinstructions. The first microinstruction receives as an input operand the instruction floating-point input operand and generates an intermediate result from the instruction input operand. The second microinstruction receives as an input operand the intermediate result of the first microinstruction and generates the floating-point result of the instruction from the intermediate result. The microprocessor is configured to execute the first and second microinstructions such that the commencement of their executions may have indeterminate separation in time.

In yet another aspect, the present invention provides a method for executing an instruction by a microprocessor, the instruction specifying a floating-point input operand having a predetermined size, wherein the instruction instructs the microprocessor to round the floating-point input operand to an integer value using a rounding mode and return a floating-point result having the same predetermined size as the input operand. The method includes translating the instruction into first and second microinstructions, wherein the translating is performed by an instruction translator of the microprocessor. The method also includes executing the first and second microinstructions, wherein the executing is performed by an execution unit of the microprocessor. The first microinstruction receives as an input operand the instruction floating-point input operand and generates an intermediate result from the instruction input operand. The second microinstruction receives as an input operand the intermediate result of the first microinstruction and generates the floating-point result of the instruction from the intermediate result. The intermediate result is the same predetermined size as the instruction floating-point input operand.

In yet another aspect, the present invention provides a method for executing an instruction by a microprocessor, the instruction specifying a floating-point input operand having a predetermined size, wherein the instruction instructs the microprocessor to round the floating-point input operand to an integer value using a rounding mode and return a floating-point result having the same predetermined size as the input operand. The method includes translating the instruction into first and second microinstructions, wherein the translating is performed by an instruction translator of the microprocessor. The method also includes executing the first and second microinstructions, wherein the executing is performed by an execution unit of the microprocessor. The first microinstruction receives as an input operand the instruction floating-point input operand and generates an intermediate result from the instruction input operand. The second microinstruction receives as an input operand the intermediate result of the first microinstruction and generates the floating-point result of the instruction from the intermediate result. The microprocessor is configured to execute the first and second microinstructions such that the commencement of their executions may have indeterminate separation in time.

BRIEF DESCRIPTION OF THE DRAWINGS

FIG. 2 is a block diagram illustrating the data format of an intermediate result of the XROUND1 microinstruction that is conveyed to the XROUND2 microinstruction.

DETAILED DESCRIPTION OF THE INVENTION

Embodiments are described herein of a low latency floating point hardware design without addition of poorly utilized, special function circuit components. The constituent circuit elements are separated into minimal groups required for classes of calculation, thereby minimizing overall circuit delay per calculation. To provide the operations required for the ROUND instruction without undesirable addition of special purpose hardware, these operations are scheduled and dispatched sequentially into an appropriate circuit group.

It next becomes necessary to decide if the two required operations, which are referred to in the embodiments described herein as microinstructions named XROUND1 and XROUND2, will be scheduled and dispatched immediately adjacent to one another in locked fashion, or if they can be treated as independent microinstructions that must be sequential but may have indeterminate separation in time or clock cycles.

Figure 1:
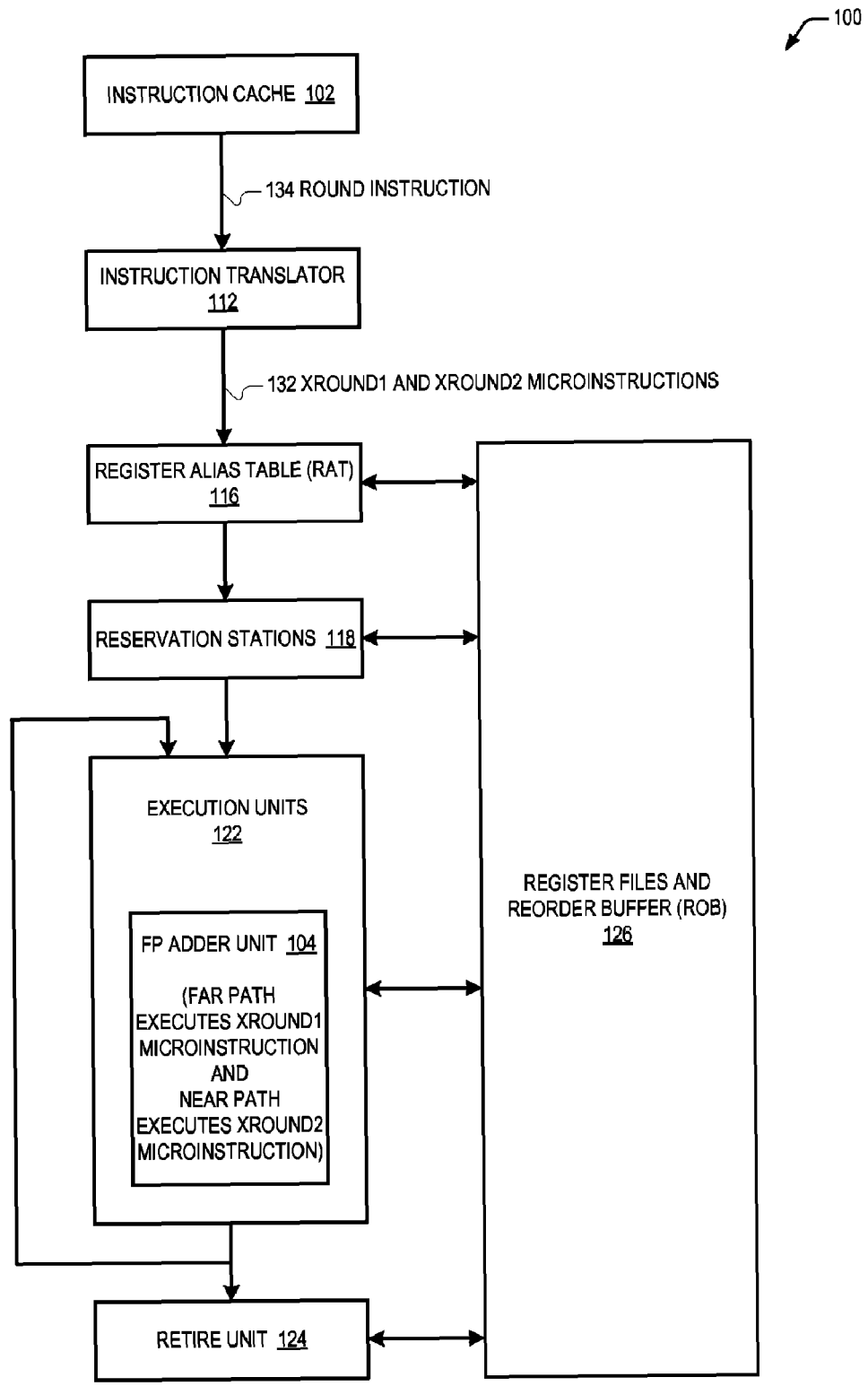
FIG. 1 is a block diagram illustrating a microprocessor.

An out-of-order microinstruction dispatch architecture is provided in the microprocessor 100 of FIG. 1 that seeks to minimize average cycles-per-instruction, and consequent software latency, by maximally utilizing available computation circuits. The present inventors have determined that special case dispatch requirements (such as locking two microinstructions together in dispatch for a particular software instruction) would require undesirable complexity in the dispatch circuit, and contribute undesirable circuit delay. Consequently, the microinstructions required for the ROUND instruction necessarily tolerate indeterminate temporal separation.

With out-of-order instruction dispatch, it is particularly desirable that the required operations (XROUND1 and XROUND2) do not necessitate preservation of additional architectural state. Certain architectural state, in the form of calculated result bits stored to registers, or previously afforded condition code bits in the MXCSR, already exist. Attendant to those are dependency detection and scheduling logic or circuits (e.g., RAT 116 and reservation stations 118 of FIG. 1), and necessary physical wire connections to accomplish data recording and forwarding. Additionally, register files (e.g., register files and ROB 126 of FIG. 1) are provided to store this data for indeterminate intervals. Any additional architectural state required for communication from the XROUND1 microinstruction to the XROUND2 microinstruction would necessitate addition of significant dependency detection, scheduling, and forwarding logic and circuits; however, it is undesirable to provide these capabilities on a special-case basis for only one class of software instruction.

Thus, embodiments described herein take a novel approach to implementing the operations or microinstructions required for the ROUND instruction that does not require additional architectural state for transferring or communicating data from the first operation to the second operation. This is advantageous in the design of low latency, high clock frequency floating point execution hardware.

Referring now to FIG. 1, a block diagram illustrating a microprocessor 100 is shown. The microprocessor 100 includes an instruction cache 102 that caches program instructions of the instruction set architecture of the microprocessor 100. In one embodiment, the instruction set includes instructions of the well-known SSE instruction set, which includes the ROUND instruction 134 described above. The instruction cache 102 provides instructions to an instruction translator 112 that translates the program instructions (also known as macroinstructions) into constituent instructions (also known as microinstructions or micro-operations) for execution by execution units 122 of the microprocessor 100. According to one embodiment, the instruction translator 112 translates the ROUND macroinstruction into two microinstructions 132, namely an XROUND1 and an XROUND2 microinstruction, as described with respect to blocks 402 and 404 of FIG. 4.

Figure 4:
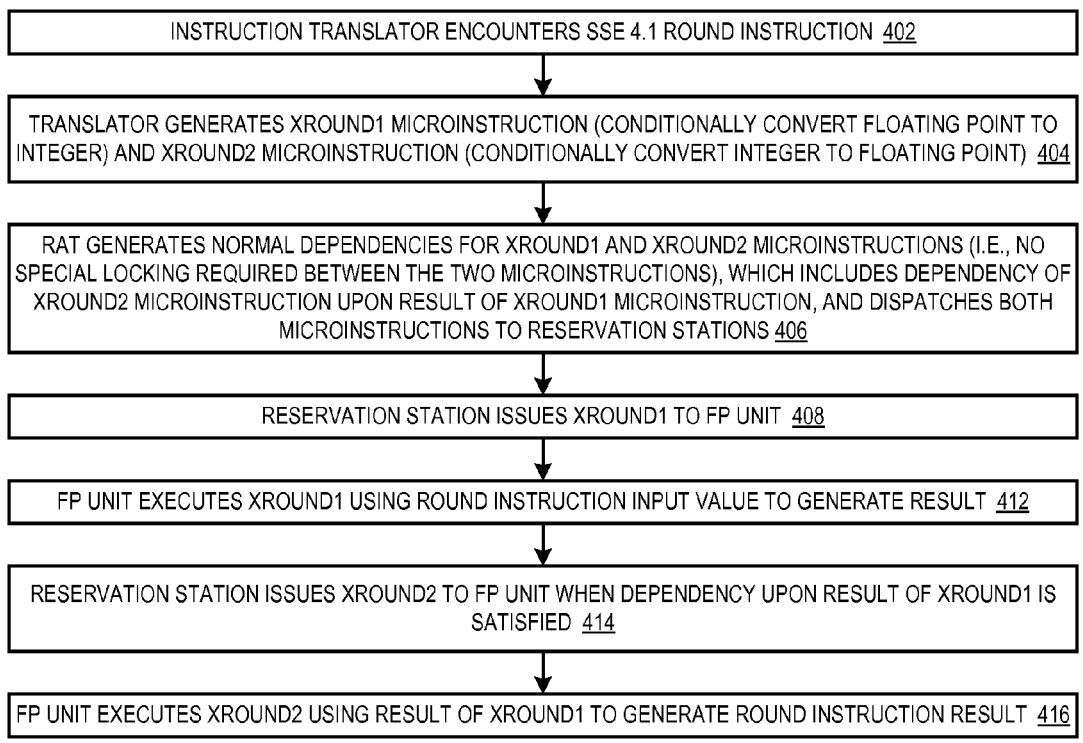
FIG. 4 is a flowchart illustrating operation of the microprocessor of FIG. 1.

The instruction translator 112 provides the translated microinstructions to a register alias table (RAT) 116 that generates instruction dependencies and maintains a table thereof, as described with respect to block 406 of FIG. 4. The microprocessor 100 also includes a plurality of reservation stations 118 associated with the execution units 122 to hold microinstructions waiting to be dispatched to the execution units 122 for execution, such as the XROUND1 microinstruction and the XROUND2 microinstruction, as described with respect to blocks 408 and 414 of FIG. 4. The RAT 116 receives the microinstructions in program order and may dispatch them to the reservation stations 118 out of program order subject to the dependencies. A retire unit 124 retires the instructions in program order. The program order is maintained by a reorder buffer (ROB) 126. The ROB and register files 126 are coupled to the RAT 106, reservation stations 118, execution units 122, and retire unit 124. The register files 126 include architectural register files and non-architectural register files for storing intermediate microinstruction results.

The execution units 122 include a floating-point adder unit 104. The floating-point adder unit 104 includes a far path that executes the XROUND1 microinstruction and a near path that executes the XROUND2 microinstruction, as described with respect to blocks 412 and 416 of FIG. 4. The execution units 122 also include forwarding paths for forwarding instruction results to one another.

Next, specific mathematical result classes are considered to demonstrate the features and function of the embodiments. SSE single precision (SP) and double precision (DP) floating point number formats define a finite set of exponent values. In both formats, there is a single sign bit. In the SP format, the exponent is 8 bits (range=−126 to +127) and the significand is 23 bits; whereas, in the DP format, the exponent is 11 bits (range=−1022 to +1023) and the significand is 52 bits. Both formats also specify an implied significand bit when the floating point input value is in normalized form. That is, in normalized form, the SP format specifies an implied $24^{th}$ bit to the left of the binary point that has a value of '1', and the DP format specifies an implied $53^{rd}$ bit to the left of the binary point that has a value of '1'. Two considerations arise from this input number format.

The first consideration is that the input exponent field is capable of specifying a value such that all bits of the input significand are integer bits, i.e., no fractional bits are represented in the significand. That is, for example in the SP case, if the exponent value is 23 or greater (i.e., the exponent value represents 2^23 or greater, which according to one embodiment takes into account a reference exponent value), then a conversion to an integer value will produce no fraction bits to the right of the round point. Advantageously, we designate this case as the "ROUND overflow" case for the ROUND instruction. In the ROUND overflow case, no difference will exist between the input and output values for the instruction. In this case, the input value is already represented as an integer in floating point format and no rounding is required to produce the correct result value.

The second consideration is that the implied significand bit may create a need for additional architectural state in designs that temporally separate the first (convert to integer) and second (convert to floating point) operations, as will be explained.

In the ROUND overflow case, it is possible to cancel the subsequent convert to floating point microinstruction since the final result is known, but this would create complexity during instruction completion and possible data forwarding to other instructions. If the XROUND2 microinstruction were conditionally cancelled after dispatch, conditionally forwarding data from either the XROUND1 or XROUND2 microinstruction would be necessary, and may or may not have performance benefits, depending upon whether the dependent instruction(s) had already been scheduled or dispatched. The ensuing complexity becomes obvious. Although the embodiments described herein detect the ROUND overflow case during the XROUND1 microinstruction, they always issue and execute the XROUND2. This is advantageous because it reduces complexity in data forwarding and instruction completion.

As discussed below, when the floating-point adder unit 104 detects the ROUND overflow case, it communicates that information from the XROUND1 microinstruction to the XROUND2 microinstruction. SP and DP input numbers can be very large values. When converted to integer, the size of their binary representation could easily exceed their input sizes (32 bits for SP and 64 bits for DP). This would create a particularly undesirable need for additional, special case storage registers of extreme size, and additional result bus wires. For this reason, in ROUND overflow cases, it is undesirable to convert the input floating point value to a traditional binary integer representation.

Figure 5:
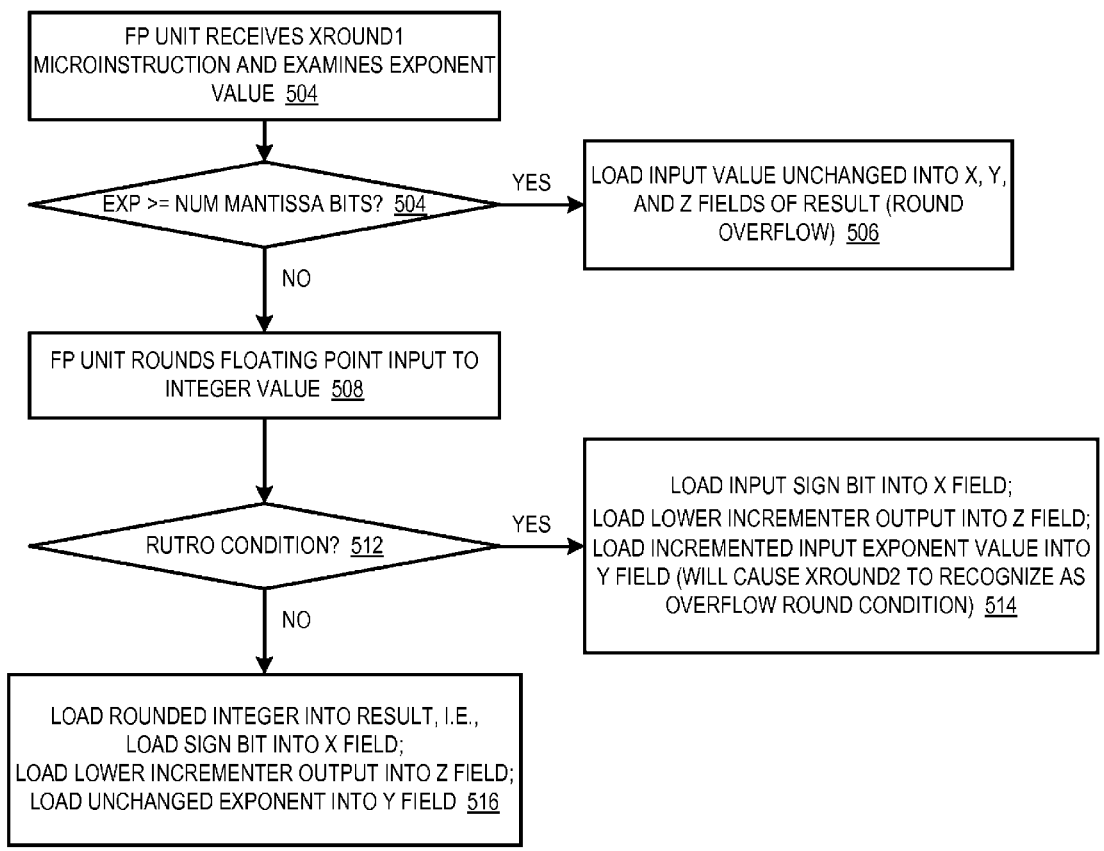
FIG. 5 is a flowchart illustrating operation of the floating-point unit of FIG. 3A to execute the XROUND1 microinstruction.

The floating-point adder unit 104 detects the magnitude of the input exponent to the XROUND1 microinstruction (the input to the ROUND instruction is provided as an input to the XROUND1 microinstruction), as described with respect to decision block 504 of FIG. 5, and selectively performs no conversion to integer in the ROUND overflow case. This enables the microprocessor 100 to communicate the input sign, exponent, and significand (all unchanged) to the XROUND2 microinstruction, as described with respect to block 506 of FIG. 5.

Additionally, this example demonstrates the form of data communication from the XROUND1 microinstruction to the XROUND2 microinstruction, as shown in FIG. 2. That is, the data format of the data communicated from the XROUND1 microinstruction to the XROUND2 microinstruction consists of three fields designated X 202, Y 204, and Z 206 in FIG. 2. The X field 202 is a single bit that has the value of the sign bit of the ROUND instruction input. The Y field 204 is an 8-bit field in SP format and an 11-bit field in DP format that holds a conditionally incremented version of the ROUND instruction input exponent, as discussed in detail below. The Z field 206 is a 23-bit field in SP and a 52-bit field in DP that holds bits understood to be either unchanged ROUND instruction input significand bits or converted_integer_bits, as described with respect to blocks 514 and 516 of FIG. 5. This data format, providing for sign, exponent, and other data bits that may conditionally comprise a converted integer value, is novel and unique for implementation of new the ROUND instruction instructions. It provides certain advantages for both performance and reduced complexity. Significantly, the total number of these bits will not exceed the input data format size, whether SP or DP, in order to advantageously use existing data forwarding buses and registers without creating special purpose logic and attendant complexity.

If the input data value is not a ROUND overflow value, it is necessary to perform the convert to integer operation, as described with respect to block 508 of FIG. 5. In this case, the number of bits required to represent the resulting integer will generally not exceed the number of bits that were required to represent the input significand, excluding the implied bit. Consequently, the microprocessor 100 is not prevented from using the previously described data format from the XROUND1 microinstruction to the XROUND2 microinstruction.

However, this point is particularly important: in one input value case, the input significand may "round up" during the conversion to integer by the XROUND1 microinstruction and thus require one more bit of representation than provided by the significand bits exclusive of the implied bit. In other words, the input data value may round up to become a ROUND overflow case. We refer to this case as the Round Up To ROUND Overflow (RUTRO) case. In the RUTRO case, it becomes necessary to indicate that an additional bit is an essential part of the integer produced by the XROUND1 microinstruction, and must be considered by the XROUND2 microinstruction when it converts from integer to floating point representation. No explicit architectural state or prior technique exists for preserving this additional bit value, particularly in the previously described form of communication from the XROUND1 microinstruction to the XROUND2 microinstruction, which entails advantages previously described. Therefore, the present inventors invented a novel technique, in conjunction with their previously described data format, for communicating the RUTRO case, as detected with respect to block 512 of FIG. 5, from the XROUND1 microinstruction to the XROUND2 microinstruction as described here.

For a positive XROUND1 value input (i.e., sign bit is 0), the floating-point adder unit 104 detects an appropriate boundary exponent value input (for SP it is 22 and for DP it is 51) and conditionally increments that value when it detects the RUTRO case. The conditionally incremented exponent value is conveyed from the XROUND1 microinstruction to the XROUND2 microinstruction using the previously described data format, as described with respect to block 514 of FIG. 5. Along with the conditionally incremented exponent value, the microprocessor 100 conveys certain converted_integer_bits from the XROUND1 microinstruction to the XROUND2 microinstruction, as described with respect to block 514 of FIG. 5. Significantly, the bit value of these conveyed integer bits will later expedite production of the desired result during execution of the XROUND2 microinstruction, which converts to floating point. The value of these conveyed integer bits will be the value required in the final ROUND instruction significand bits for the RUTRO case. In one embodiment, this value is optimally produced using no special provision during the signed convert to integer operation. Using this approach to fullest advantage for input values with positive sign, the RUTRO case is trivially detected by appropriately sensing polarity of the additional bit of integer significance with respect to the XROUND1 input sign bit.

Figure 3A:
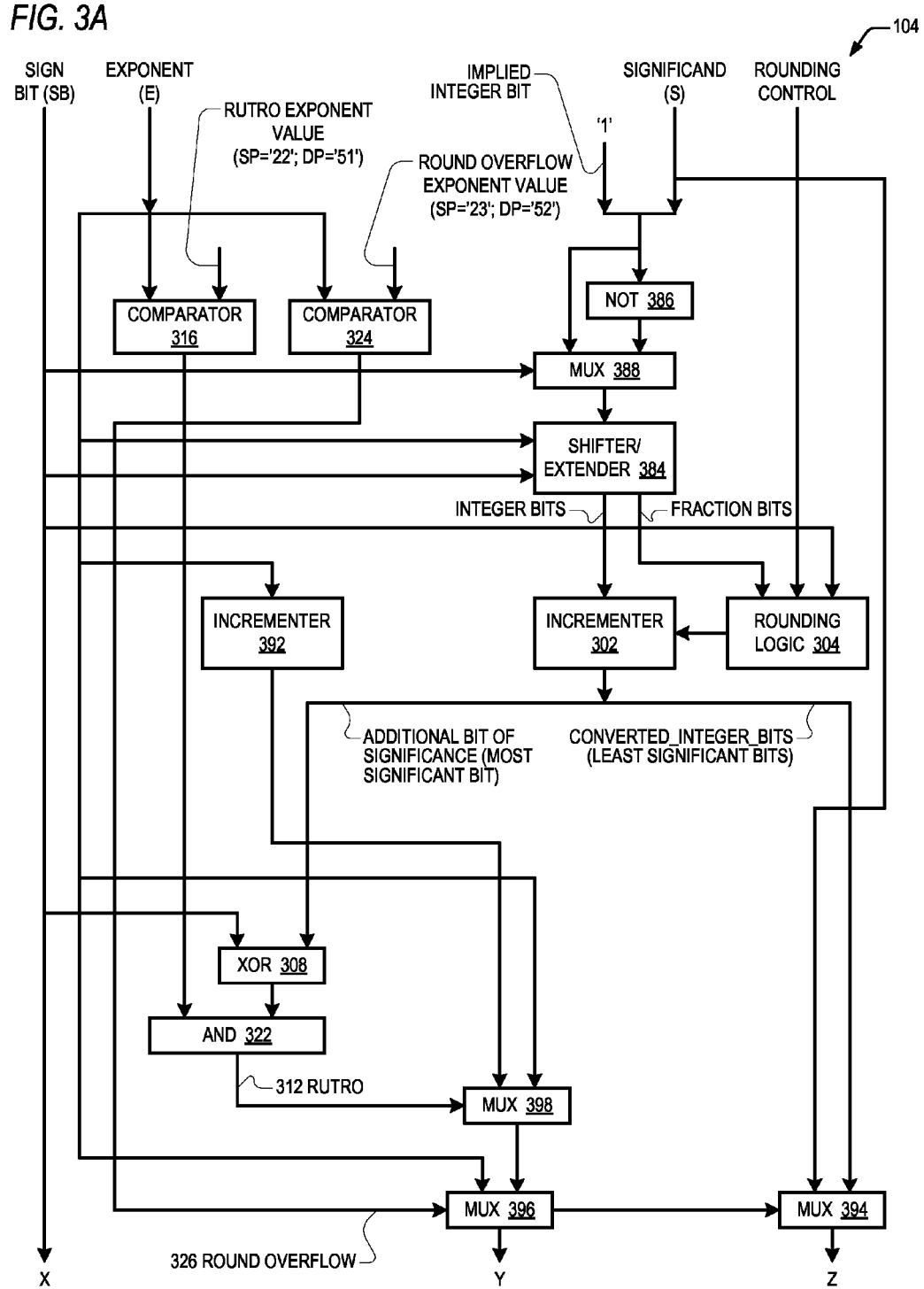
FIG. 3A is a block diagram illustrating portions of the floating-point unit of the microprocessor of FIG. 1 for executing the XROUND1 microinstruction.
Figure 6:
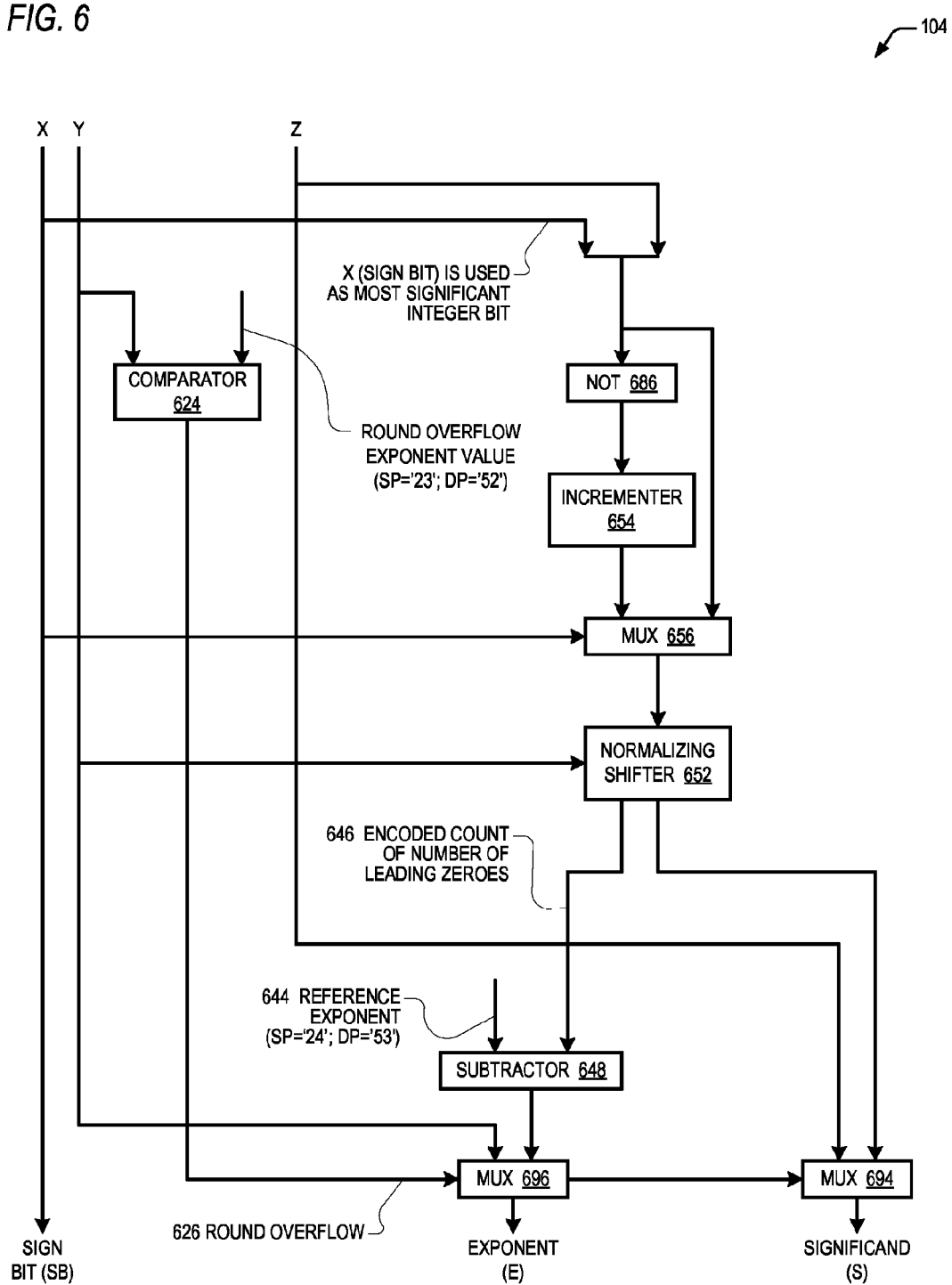
FIG. 6 is a block diagram illustrating portions of the floating-point unit of the microprocessor of FIG. 1 for executing the XROUND2 microinstruction.

FIG. 3A illustrates a portion of the circuitry of the floating point unit 104 of FIG. 1 that executes the XROUND1 microinstruction. In one embodiment, the floating point unit 104 includes a far path and a near path used in high-speed floating point addition. The portion shown in FIG. 3A is associated with the far path and is used to execute the XROUND1 microinstruction. The portion shown in FIG. 6 is associated with the near path and is used to execute the XROUND2 microinstruction, as discussed below. The inverters 386, mux 388, shifter/extender 384, incrementer 302, and rounding logic 304 operate together to generate a rounded two's complement integer value from the XROUND1 floating point input. In the case of a positive input value, the shifter/extender 384 receives the input significand including the implied integer bit and then zero-extends; in the case of a negative input value, the shifter/extender 384 receives the input significand including the implied integer bit complemented and then sign-extends. The shifter/extender 384 shifts the input based on the input exponent to cause the least significant integer bit of the output to be provided to the least significant bit input of the incrementer 302. Thus, the shifter/extender 384 outputs a right-aligned zero-extended value if the input is positive and outputs a right-aligned sign-extended one's complement value if the input is negative. (In one embodiment, the incrementer 302 is a 64-bit 2-input operand adder with a carry-in input; only the lower 24 bits are used in the SP case, and only the lower 53 bits are used in the DP case; the second input operand is zero in the case of an XROUND1 microinstruction.) The shifter/extender 384 also provides to the rounding logic 304 the fractional bits.

Figure 3B:
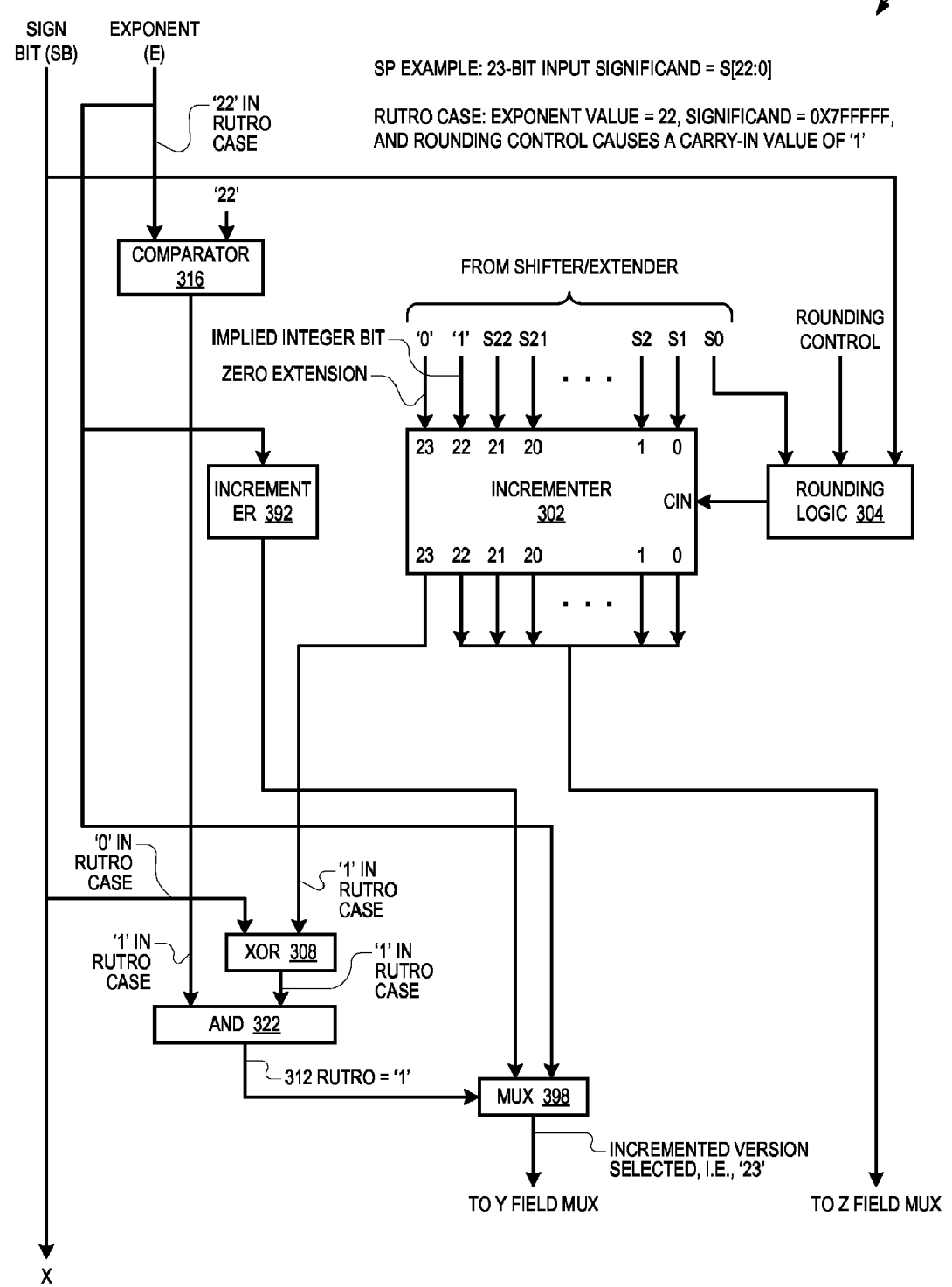
FIG. 3B is a block diagram illustrating portions of the floating-point unit of FIG. 3A in the ROUND overflow case.

The example shown in FIG. 3B illustrates a RUTRO case for a SP input, although it should be appreciated that the unit 104 is also capable of handling the RUTRO case for a DP input. In the example of FIG. 3B, the unit 104 receives the 32-bit input, whose significand bits are designated S22 through S0. In the example of FIG. 3B, the exponent value is 2^22 (i.e., the exponent value represents 2^22, which according to one embodiment takes into account a reference exponent value); thus, the shifter/extender 384 has shifted the input such that the S1 bit is provided to the least significant bit input (input bit 0) of the 24-bit incrementer 302 and the S22 bit is provided to input bit 21 of the incrementer 302. That is, in the example, the binary point of the shifted input value is between the S1 and the S0 bits. The incrementer 302 input bit 22 receives the implied integer bit (a '1' value), and the input bit 23 receives a '0' value. The S0 bit is provided to rounding logic 304 that generates a rounding bit value based on the rounding control 306 value, the S0 bit and the sign bit. In one embodiment, the rounding logic 304 performs injection rounding and conditionally performs the increment associated with the generation of the two's complement of a negative number, i.e., the rounding logic 304 takes into account whether the one's complement value provided to the incrementer 302 needs to be incremented alternate to any rounding considerations. The rounding bit output of the rounding logic 304 is provided to the incrementer 302 as the carry-in bit. The additional bit of integer significance is the output bit 23 of the incrementer 302, which in the example will be a '1'. In particular, in the SP case, if the sign is positive, the exponent value is 22, the significand value exclusive of the implied integer bit is 0x7FFFFF, and the rounding control value causes round up, then the RUTRO case is present, in which case the output of the comparator 316 will be true and the output of the incrementer 302 will be 0x800000 (i.e., bit 23 is a '1').

As described above and shown in FIG. 3B, in response to detecting the RUTRO case, to execute the XROUND1 microinstruction, the floating point unit 104 will increment the exponent value (from 22 to 23 in the SP case). Additionally, since prior to incrementing the exponent value the input was not a ROUND overflow case, the floating point unit 104 will place the converted_integer_bits (i.e., all but the most significant integer bit of the output of the incrementer 302, which is output bits 0 through 22 in the SP case) into the Z field 206 of the XROUND1 result value for provision to the XROUND2 microinstruction. In the RUTRO case, the converted_integer_bits will be all zeroes. Advantageously, the XROUND2 microinstruction will detect the XROUND1 result value in the RUTRO case as a ROUND overflow case (e.g., in the SP case the Y field 204 value is 23) and will simply pass its input value through as its output value to be the result of the ROUND instruction, which is the correct result. That is, the additional bit of significance in the result of the ROUND instruction will be supplied by the '1' valued implied integer bit inherent in the floating point format.

Advantageously for timing sake, as shown in FIGS. 3A and 3B, the detection of the RUTRO boundary exponent input value can be performed by the comparator 316 immediately, i.e., in parallel with operation of the shifter/extender 384 and incrementer 302. Further advantageously for timing sake, although an XOR 308 and an AND 322 are performed sequentially with the compare 316 and increment 302, they are fast because they are each only 2 bit operations. As shown in FIG. 3B, the XOR gate 308 receives the input sign bit and the additional bit of integer significance of the result of the rounding to integer operation performed on the input by the incrementer 302. Thus, if the sign bit is 0 (positive input value) and the additional bit of integer significance of the result is 1, and if the input exponent value is the boundary exponent value for the input floating point format, then the RUTRO case is detected.

While positive input values may RUTRO, negative values may Round Down To ROUND Overflow (RDTRO), i.e., toward negative infinity. The RDTRO case requires a technique different from the previously described positive value RUTRO technique. The polarity of the additional bit of integer significance (with respect to the sign bit) is not adequate to indicate RDTRO. That is, the XOR 308 of FIG. 3A will not produce a '1' value, since both the sign bit and the additional bit of integer significance are both '1'. This is because the "first" negative (i.e., the most negative representable rounded integer), or boundary, ROUND overflow value (i.e., in SP case, an input value having sign bit='1', exponent=22, and significand=0x7FFFFF that produces an output value having a sign bit='1', Y field 204 value=22, incrementer output=0x800000) does not cause a change of polarity for the most significant converted integer bit (i.e., the most significant bit in the most significant nibble is '1' and so is the sign bit), and would be undetectable using the previously described XOR 308 detection scheme. Consequently, the floating-point unit 104 does not increment the detected boundary value exponent for cases of RDTRO. Rather, it applies a complimentary technique to arrive at the correct result expeditiously. To cover this and other cases with a negative input value, the XROUND2 microinstruction (which converts to floating point), concatenates the input sign bit value (i.e., the X field 202 value) as the most significant bit onto the input converted_integer_bits, as shown in FIG. 6. This provides correct conversion from signed (positive or negative) two's complement integer for the entire range of representable bit values. In conjunction with the previously described technique for positive RUTRO, both positive and negative values rounding to ROUND overflow are correctly calculated as well.

Using the SP case as an example, the input value to the XROUND1 microinstruction that would produce the RDTRO case is a negative sign bit (i.e., value '1'), an exponent value of 22, and a 23-bit significand value of 0x7FFFFF in conjunction with a rounding control value that causes the carry-in to the 24-bit incrementer 302 to be a '0' value by virtue of the fact that a two's complement number is being rounded toward negative infinity. Consequently, with the appropriate rounding control value, the output of the incrementer 302 is 0x800000, which has an additional bit of integer significance with a value of '1'. This true 24-bit converted integer value of 0x800000 cannot be represented within the 23-bit Z field 206 of the result. Thus, the 23-bit 0x00000 value is placed into the 23-bit Z field 206 of the XROUND1 microinstruction result and the necessary additional bit of integer significance is conveyed to the XROUND2 microinstruction by the X bit 202 value of '1'. It is noted that the 0x800000 value indicates the largest negative two's complement integer that can be represented with 24 bits. Thus, when the XROUND2 microinstruction converts the 0x800000 integer to a floating point value, the correct result is produced.

Conveyance of these special X field 202, Y field 204 and Z field 206 values to the XROUND2 microinstruction for the cases of RUTRO and RDTRO is an additional advantage of using the data format described herein for communicating information from the XROUND1 microinstruction to the XROUND2 microinstruction. This data format retains the necessary significance of the additional integer bit value through any temporal separation of the two required operations, which are provided as the XROUND1 and XROUND2 microinstructions. It should be clear that in positive value cases (i.e., the sign bit is '0') where the conveyed Y field 204 value is less than required to indicate a ROUND overflow case, the convert to floating point operation performed by the XROUND2 microinstruction according to the portion of the floating-point unit 104 described in FIG. 6 will interpret this conveyed X field 202 bit value as having no significance (since it is '0').

Figure 7:
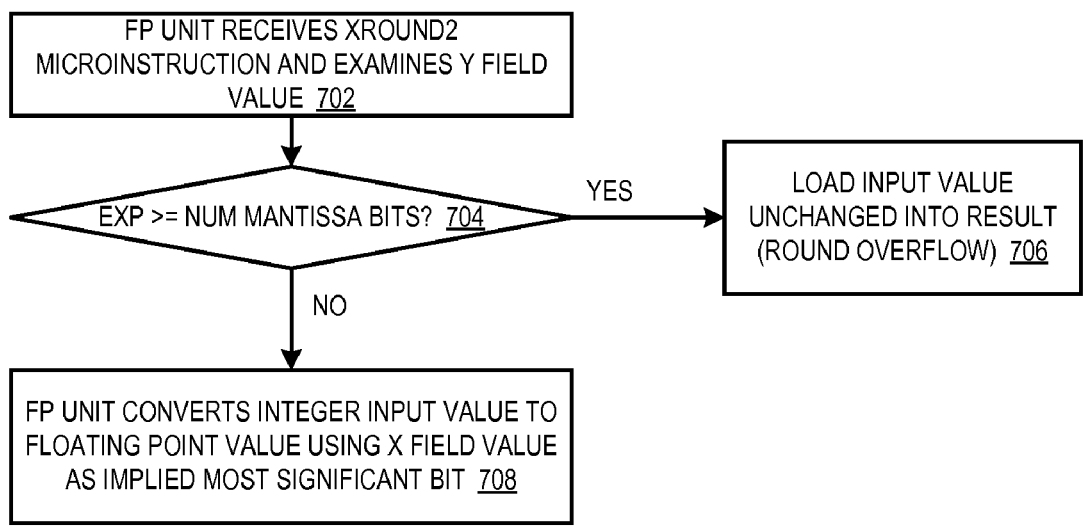
FIG. 7 is a flowchart illustrating operation of the floating-point unit of FIG. 6 to execute the XROUND2 microinstruction.

As shown in the flowchart of FIG. 7, for the XROUND2 microinstruction, first the Y field 204 value provided by the XROUND1 microinstruction is examined, in one embodiment by re-using the same circuit used to perform this check for the XROUND1 microinstruction. If the value of the Y field 204 does not represent a ROUND overflow case, the floating-point unit 104 selectively performs a convert to floating point operation using the converted_integer_bits previously provided by the XROUND1 microinstruction within the Z field 206, and by concatenating the X field 202 value onto the most significant bit of the input converted_integer_bits. If the value of the examined Y field 204 does represent a ROUND overflow case, as previously described, then the floating-point unit 104 selectively does not perform a convert to floating point operation. In this case, the X, Y, and Z field values are conveyed, unchanged, as the result of the XROUND2 microinstruction, and as the correct result of the ROUND instruction overall. From this, it is clear that the correct result is afforded advantageously with little complexity.

Figure 8:
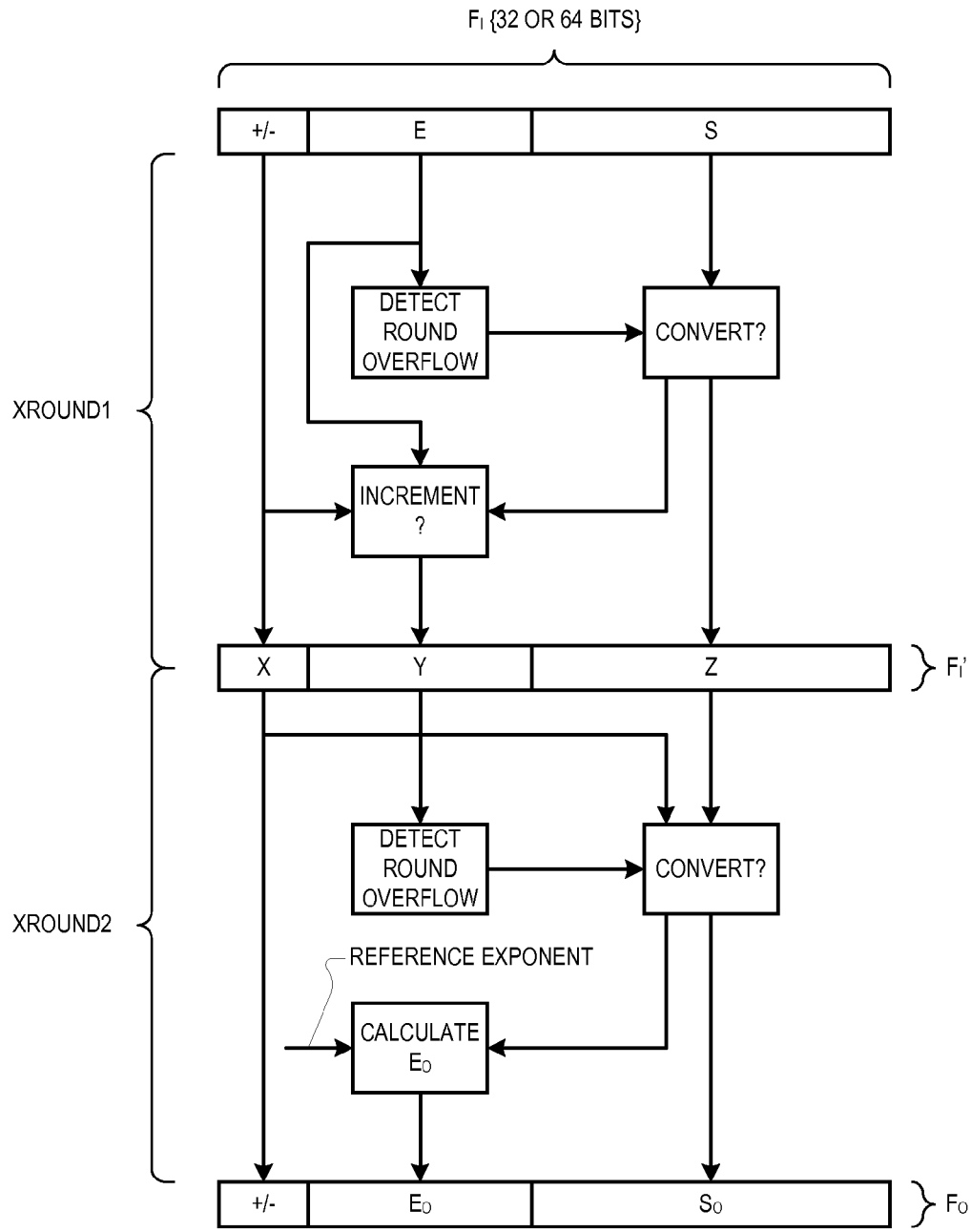
FIG. 8 is a flow diagram illustrating execution of the ROUND instruction by the microprocessor 100 of FIG. 1 through the agency of the XROUND1 microinstruction and XROUND2 microinstruction and the intermediate result having the data format of FIG. 2.

FIG. 8 illustrates in a pictorial fashion the overall process of executing the SSE 4.1 ROUND instruction as described in detail above.

Although embodiments have been described in which the XROUND2 microinstruction commences execution after the XROUND1 microinstruction in order to receive the intermediate result of the XROUND1 microinstruction, an embodiment is contemplated in which the microprocessor predicts that the ROUND overflow case will exist and speculatively executes the XROUND2 microinstruction using the ROUND instruction input operand value (which is the same value as the XROUND1 microinstruction intermediate result value in the ROUND overflow case); if the speculation is incorrect, the XROUND2 microinstruction is replayed using the XROUND1 microinstruction intermediate result. This enables the XROUND2 microinstruction to actually commence its execution ahead of or simultaneously with the XROUND1 microinstruction.

Furthermore, although embodiments have been described in which the intermediate result in the X and Z field values taken together represent a two's complement integer value, other embodiments are contemplated in which they represent an unsigned integer value or a sign-magnitude integer value or a one's complement integer value. For example, the unsigned or sign-magnitude representation could provide the unique overflow boundary value needed for the RDTRO case (e.g., for single-precision, 24 bits=0x800000) by detecting and incrementing the exponent (as for the RUTRO case in the two's complement embodiments). Furthermore, with respect to the one's complement representation, the XROUND1 microinstruction may round the input value prior to conversion to one's complement, detect the rounded overflow boundary value causing an exponent increment, and convert to one's complement only if no exponent increment is caused; and, the XROUND2 microinstruction may detect an overflow exponent condition and cause the input to be passed through to the output, and detect a less than overflow exponent condition and cause a conversion from one's complement representation, followed by normalization and a final exponent calculation. These provisions for one's complement representation would adequately distinguish positive and negative round overflow with an appropriate X bit value and an appropriate Y field value, while conveying the desired final rounded integer value where the most significant bit of the integer is implied as for the RUTRO case (and not supplied as for the RDTRO case) in the two's complement embodiments. These provisions allow the following values and their proper and unique one's complement representation, in the single-precision case, for example:
1) positive (RUTRO boundary-1): X=0, Y=2e22, Z=0x7FFFFF (23 bits) (thus, the one's complement integer representation is 0x7FFFFF because the most significant bit is supplied by X, as in the two's complement embodiments)
2) negative (RUTRO boundary-1): X=1, Y=2e22, Z=0x000000 (23 bits) (thus, the one's complement integer representation is 0x800000 because the most significant bit is supplied by X, as in the two's complement embodiments)
3) positive zero: X=0, Y=0, Z=0x000000 (23 bits) (thus, the one's complement integer representation is 0x000000 because the most significant bit is supplied by X, as in the two's complement embodiments)
4) negative zero: X=1, Y=0, Z=0x7FFFFF (23 bits) (thus, the one's complement integer representation is 0xFFFFFF because the most significant bit is supplied by X, as in the two's complement embodiments)

Still further, although embodiments have been described in which the size of the ROUND instruction result is the same as the size of its input operand, other embodiments are contemplated in which the result size is different than the input size. For example, the XROUND1 microinstruction may be modified to shift the input operand to align it to a different round point, and the XROUND2 microinstruction may be modified to normalize and format the result to a new desired size, potentially including calculation of a different exponent result.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

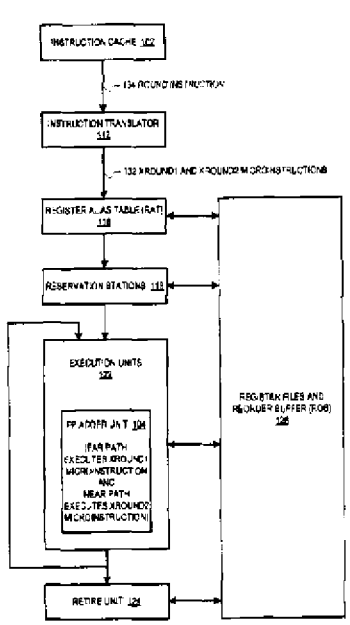

We claim:

1. A microprocessor configured to execute an instruction, the instruction specifying a floating-point input operand having a predetermined size, wherein the instruction instructs the microprocessor to round the floating-point input operand to an integer value using a rounding mode and return the integer value as a floating-point result having the same predetermined size as the input operand, the microprocessor comprising:
an instruction translator, configured to translate the instruction into first and second microinstructions; and
an execution unit, configured to execute the first and second microinstructions;
wherein the first microinstruction receives as an input operand the instruction floating-point input operand and generates an intermediate result from the instruction input operand;
wherein the second microinstruction receives as an input operand the intermediate result of the first microinstruction and generates the floating-point result of the instruction from the intermediate result;
wherein the intermediate result is the same predetermined size as the instruction floating-point input operand.

2. The microprocessor of claim 1, wherein the microprocessor is configured to execute the first and second microinstructions such that the commencement of their executions may have indeterminate separation in time.

3. The microprocessor of claim 2, wherein the second microinstruction commences execution after the first microinstruction.

4. The microprocessor of claim 1, wherein the second microinstruction always executes, regardless of the intermediate result of the first microinstruction.

5. The microprocessor of claim 1, wherein the instruction is a Streaming SIMD Extensions (SSE) ROUND instruction.

6. The microprocessor of claim 1, wherein the instruction floating-point input operand has a single sign bit, an M-bit exponent, and an N-bit significand, wherein the intermediate result includes a first single bit field, a second M-bit field, and a third N-bit field, wherein the execution unit is configured to execute the first microinstruction to generate the intermediate result such that:
(1) when the exponent represents $2^N$ or greater, the intermediate result is the input operand unchanged;
(2) when the exponent represents $2^{(N-1)}$ and the significand is all binary ones and the rounding mode causes round-up, the first field is the input operand sign bit, the second field is equal to N, and the third field is all binary zeroes.

7. The microprocessor of claim 6, wherein the execution unit is configured to execute the second microinstruction to generate the instruction floating-point result such that:
when the second field represents $2^N$ or greater, the instruction result is the intermediate result unchanged.

8. The microprocessor of claim 7, wherein the instruction floating-point result has a single sign bit, an M-bit exponent, and an N-bit significand, wherein the execution unit is further configured to execute the second microinstruction to generate the instruction floating-point result such that:
when the second field represents less than $2^N$, the execution unit considers the first field bit appended as a most significant bit to the third field to be an integer value and converts the integer value to the instruction floating-point result.

9. The microprocessor of claim 8, when the second field represents less than $2^N$, the instruction floating-point result sign bit is the first field bit.

10. The microprocessor of claim 8, wherein the execution unit is configured to execute the first microinstruction to generate the intermediate result such that:
  when neither condition (1) nor (2) is true:
    the first field bit is the instruction floating-point input operand sign bit; and
    the third field is an N-bit rounded two's complement integer value converted from the instruction floating-point input operand.

11. The microprocessor of claim 10, wherein the execution unit is further configured to execute the first microinstruction to generate the intermediate result such that:
  when neither condition (1) nor (2) is true:
    the second field is the instruction floating-point input operand exponent unchanged.

12. The microprocessor of claim 1,
  wherein the instruction floating-point input operand has a single sign bit, an M-bit exponent, and an N-bit significand, wherein the intermediate result includes a first single bit field, a second M-bit field, and a third N-bit field;
  wherein the execution unit is configured to execute the first microinstruction to generate the intermediate result such that when the exponent represents $2^{(N-1)}$, the significand is all binary ones, the sign bit is negative, and the rounding mode indicates round in the direction of negative infinity:
    the first field bit is the instruction floating-point input operand sign bit;
    the second field is the instruction floating-point input operand exponent unchanged; and
    the third field is an N-bit rounded two's complement integer value converted from the instruction floating-point input operand;
  wherein the instruction floating-point result has a single sign bit, an M-bit exponent, and an N-bit significand;
  wherein the execution unit is further configured to execute the second microinstruction to generate the instruction floating-point result such that when the second field represents $2^{(N-1)}$, the execution unit considers the first field bit appended as a most significant bit to the third field to be an integer value and converts the integer value to the instruction floating-point result.

13. A microprocessor configured to execute an instruction, the instruction specifying a floating-point input operand having a predetermined size, wherein the instruction instructs the microprocessor to round the floating-point input operand to an integer value using a rounding mode and return the integer value as a floating-point result having the same predetermined size as the input operand, the microprocessor comprising:
  an instruction translator, configured to translate the instruction into first and second microinstructions; and
  an execution unit, configured to execute the first and second microinstructions;
  wherein the first microinstruction receives as an input operand the instruction floating-point input operand and generates an intermediate result from the instruction input operand;
  wherein the second microinstruction receives as an input operand the intermediate result of the first microinstruction and generates the floating-point result of the instruction from the intermediate result;
  wherein the microprocessor is configured to execute the first and second microinstructions such that the commencement of their executions may have indeterminate separation in time.

14. The microprocessor of claim 13, wherein the intermediate result is the same predetermined size as the instruction floating-point input operand.

15. The microprocessor of claim 13, wherein the second microinstruction commences execution after the first microinstruction.

16. The microprocessor of claim 13, wherein the second microinstruction always executes, regardless of the intermediate result of the first microinstruction.

17. The microprocessor of claim 13, wherein the instruction is a Streaming SIMD Extensions (SSE) ROUND instruction.

18. The microprocessor of claim 13, wherein the instruction floating-point input operand has a single sign bit, an M-bit exponent, and an N-bit significand, wherein the intermediate result includes a first single bit field, a second M-bit field, and a third N-bit field, wherein the execution unit is configured to execute the first microinstruction to generate the intermediate result such that:
  (1) when the exponent represents $2^N$ or greater, the intermediate result is the input operand unchanged;
  (2) when the exponent represents $2^{(N-1)}$ and the significand is all binary ones and the rounding mode causes round-up, the first field is the input operand sign bit, the second field is equal to N, and the third field is all binary zeroes.

19. The microprocessor of claim 18, wherein the execution unit is configured to execute the second microinstruction to generate the instruction floating-point result such that:
  when the second field represents $2^N$ or greater, the instruction result is the intermediate result unchanged.

20. The microprocessor of claim 19, wherein the instruction floating-point result has a single sign bit, an M-bit exponent, and an N-bit significand, wherein the execution unit is further configured to execute the second microinstruction to generate the instruction floating-point result such that:
  when the second field represents less than $2^N$, the execution unit considers the first field bit appended as a most significant bit to the third field to be an integer value and converts the integer value to the instruction floating-point result.

21. The microprocessor of claim 20, when the second field represents less than $2^N$, the instruction floating-point result sign bit is the first field bit.

22. The microprocessor of claim 20, wherein the execution unit is configured to execute the first microinstruction to generate the intermediate result such that:
  when neither condition (1) nor (2) is true:
    the first field bit is the instruction floating-point input operand sign bit; and
    the third field is an N-bit rounded two's complement integer value converted from the instruction floating-point input operand.

23. The microprocessor of claim 22, wherein the execution unit is further configured to execute the first microinstruction to generate the intermediate result such that:
  when neither condition (1) nor (2) is true:
    the second field is the instruction floating-point input operand exponent unchanged.

24. The microprocessor of claim 13,
  wherein the instruction floating-point input operand has a single sign bit, an M-bit exponent, and an N-bit significand, wherein the intermediate result includes a first single bit field, a second M-bit field, and a third N-bit field;
  wherein the execution unit is configured to execute the first microinstruction to generate the intermediate result such that when the exponent represents $2^{(N-1)}$, the significand is all binary ones, the sign bit is negative, and the rounding mode indicates round in the direction of negative infinity:

the first field bit is the instruction floating-point input operand sign bit;

the second field is the instruction floating-point input operand exponent unchanged; and the third field is an N-bit rounded two's complement integer value converted from the instruction floating-point input operand;

wherein the instruction floating-point result has a single sign bit, an M-bit exponent, and an N-bit significand;

wherein the execution unit is further configured to execute the second microinstruction to generate the instruction floating-point result such that when the second field represents $2^{(N-1)}$, the execution unit considers the first field bit appended as a most significant bit to the third field to be an integer value and converts the integer value to the instruction floating-point result.

25. A method for executing an instruction by a microprocessor, the instruction specifying a floating-point input operand and having a predetermined size, wherein the instruction instructs the microprocessor to round the floating-point input operand to an integer value using a rounding mode and return the integer value as a floating-point result having the same predetermined size as the input operand, the method comprising:

translating the instruction into first and second microinstructions, wherein said translating is performed by an instruction translator of the microprocessor; and executing the first and second microinstructions, wherein said executing is performed by an execution unit of the microprocessor;

wherein the first microinstruction receives as an input operand the instruction floating-point input operand and generates an intermediate result from the instruction input operand;

wherein the second microinstruction receives as an input operand the intermediate result of the first microinstruction and generates the floating-point result of the instruction from the intermediate result;

wherein the intermediate result is the same predetermined size as the instruction floating-point input operand.

26. The method of claim 25, wherein said executing the first and second microinstructions comprises executing the first and second microinstructions such that the commencement of their executions may have indeterminate separation in time.

27. The method of claim 26, wherein the second microinstruction commences execution after the first microinstruction.

28. The method of claim 25, wherein the second microinstruction always executes, regardless of the intermediate result of the first microinstruction.

29. The method of claim 25, wherein the instruction is a Streaming SIMD Extensions (SSE) ROUND instruction.

30. The method of claim 25, wherein the instruction floating-point input operand has a single sign bit, an M-bit exponent, and an N-bit significand, wherein the intermediate result includes a first single bit field, a second M-bit field, and a third N-bit field, wherein said executing the first microinstruction comprises executing the first microinstruction to generate the intermediate result such that:

(1) when the exponent represents $2^N$ or greater, the intermediate result is the input operand unchanged;

(2) when the exponent represents $2^{(N-1)}$ and the significand is all binary ones and the rounding mode causes round-up, the first field is the input operand sign bit, the second field is equal to N, and the third field is all binary zeroes.

31. The method of claim 30, wherein said executing the second microinstruction comprises executing the second microinstruction to generate the instruction floating-point result such that:

when the second field represents $2^N$ or greater, the instruction result is the intermediate result unchanged.

32. The method of claim 31, wherein the instruction floating-point result has a single sign bit, an M-bit exponent, and an N-bit significand, wherein said executing the second microinstruction comprises executing the second microinstruction to generate the instruction floating-point result such that:

when the second field represents less than $2^N$, the execution unit considers the first field bit appended as a most significant bit to the third field to be an integer value and converts the integer value to the instruction floating-point result.

33. The method of claim 32, when the second field represents less than $2^N$, the instruction floating-point result sign bit is the first field bit.

34. The method of claim 32, wherein said executing the first microinstruction comprises executing the first microinstruction to generate the intermediate result such that:

when neither condition (1) nor (2) is true:

the first field bit is the instruction floating-point input operand sign bit; and the third field is an N-bit rounded two's complement integer value converted from the instruction floating-point input operand.

35. The method of claim 34, wherein said executing the first microinstruction further comprises executing the first microinstruction to generate the intermediate result such that:

when neither condition (1) nor (2) is true:

the second field is the instruction floating-point input operand exponent unchanged.

36. The method of claim 25, wherein the instruction floating-point input operand has a single sign bit, an M-bit exponent, and an N-bit significand, wherein the intermediate result includes a first single bit field, a second M-bit field, and a third N-bit field;

wherein said executing the first microinstruction comprises executing the first microinstruction to generate the intermediate result such that when the exponent represents $2^{(N-1)}$, the significand is all binary ones, the sign bit is negative, and the rounding mode indicates round in the direction of negative infinity:

the first field bit is the instruction floating-point input operand sign bit;

the second field is the instruction floating-point input operand exponent unchanged; and the third field is an N-bit rounded two's complement integer value converted from the instruction floating-point input operand;

wherein the instruction floating-point result has a single sign bit, an M-bit exponent, and an N-bit significand;

wherein said executing the second microinstruction comprises executing the first microinstruction to generate the instruction floating-point result such that when the second field represents $2^{(N-1)}$, the execution unit considers the first field bit appended as a most significant bit to the third field to be an integer value and converts the integer value to the instruction floating-point result.

37. A method for executing an instruction by a microprocessor, the instruction specifying a floating-point input operand and having a predetermined size, wherein the instruction instructs the microprocessor to round the floating-point input operand to an integer value using a rounding mode and return the integer value as a floating-point result having the same predetermined size as the input operand, the method comprising:

translating the instruction into first and second microinstructions, wherein said translating is performed by an instruction translator of the microprocessor; and executing the first and second microinstructions, wherein said executing is performed by an execution unit of the microprocessor;

wherein the first microinstruction receives as an input operand the instruction floating-point input operand and generates an intermediate result from the instruction input operand;

wherein the second microinstruction receives as an input operand the intermediate result of the first microinstruction and generates the floating-point result of the instruction from the intermediate result;

wherein the microprocessor is configured to execute the first and second microinstructions such that the commencement of their executions may have indeterminate separation in time.

38. The method of claim 37, wherein the intermediate result is the same predetermined size as the instruction floating-point input operand.

39. The method of claim 37, wherein the second microinstruction commences execution after the first microinstruction.

40. The method of claim 37, wherein the second microinstruction always executes, regardless of the intermediate result of the first microinstruction.

41. The method of claim 37, wherein the instruction is a Streaming SIMD Extensions (SSE) ROUND instruction.

42. The method of claim 37, wherein the instruction floating-point input operand has a single sign bit, an M-bit exponent, and an N-bit significand, wherein the intermediate result includes a first single bit field, a second M-bit field, and a third N-bit field, wherein said executing the first microinstruction comprises executing the first microinstruction to generate the intermediate result such that:

(1) when the exponent represents 2^N or greater, the intermediate result is the input operand unchanged;

(2) when the exponent represents 2^(N−1) and the significand is all binary ones and the rounding mode causes round-up, the first field is the input operand sign bit, the second field is equal to N, and the third field is all binary zeroes.

43. The method of claim 42, wherein said executing the second microinstruction comprises executing the second microinstruction to generate the instruction floating-point result such that:

when the second field represents 2^N or greater, the instruction result is the intermediate result unchanged.

44. The method of claim 43, wherein the instruction floating-point result has a single sign bit, an M-bit exponent, and an N-bit significand, wherein said executing the second microinstruction comprises executing the second microinstruction to generate the instruction floating-point result such that:

when the second field represents less than 2^N, the execution unit considers the first field bit appended as a most significant bit to the third field to be an integer value and converts the integer value to the instruction floating-point result.

45. The method of claim 44, when the second field represents less than 2^N, the instruction floating-point result sign bit is the first field bit.

46. The method of claim 44, wherein said executing the first microinstruction comprises executing the first microinstruction to generate the intermediate result such that:

when neither condition (1) nor (2) is true:
the first field bit is the instruction floating-point input operand sign bit; and
the third field is an N-bit rounded two's complement integer value converted from the instruction floating-point input operand.

47. The method of claim 46, wherein said executing the first microinstruction further comprises executing the first microinstruction to generate the intermediate result such that:

when neither condition (1) nor (2) is true:
the second field is the instruction floating-point input operand exponent unchanged.

* * * * *

UNITED STATES PATENT AND TRADEMARK OFFICE
CERTIFICATE OF CORRECTION

PATENT NO. : 8,386,755 B2  Page 1 of 1
APPLICATION NO. : 12/783769
DATED : February 26, 2013
INVENTOR(S) : Tom Elmer and Terry Parks It is certified that error appears in the above-identified patent and that said Letters Patent is hereby corrected as shown below:

In the Claims:

In column 18, at line 44, add the following claim after claim 47:

48. The method of claim 43,
   wherein the instruction floating-point input operand has a single sign bit, an M-bit exponent, and an N-bit significand, wherein the intermediate result includes a first single bit field, a second M-bit field, and a third N-bit field;
   wherein said executing the first microinstruction comprises executing the first microinstruction to generate the intermediate result such that when the exponent represents $2^{\wedge}(N-1)$, the significand is all binary ones, the sign bit is negative, and the rounding mode indicates round in the direction of negative infinity:
      the first field bit is the instruction floating-point input operand sign bit;
      the second field is the instruction floating-point input operand exponent unchanged; and
      the third field is an N-bit rounded two's complement integer value converted from the instruction floating-point input operand;
   wherein the instruction floating-point result has a single sign bit, an M-bit exponent, and an N-bit significand;
   wherein said executing the second microinstruction comprises executing the first microinstruction to generate the instruction floating-point result such that when the second field represents $2^{\wedge}(N-1)$, the execution unit considers the first field bit appended as a most significant bit to the third field to be an integer value and converts the integer value to the instruction floating-point result.

Signed and Sealed this
Twenty-third Day of April, 2013

Teresa Stanek Rea
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 8,386,755 B2 | |
| APPLICATION NO. | : 12/783769 | |
| DATED | : February 26, 2013 | |
| INVENTOR(S) | : Tom Elmer and Terry Parks | |

It is certified that error appears in the above-identified patent and that said Letters Patent is hereby corrected as shown below:

Delete the title page and substitute therefore the attached title page showing the corrected number of claims in patent.

In the Claims:

In column 18, at line 44, add the following claim after claim 47:

48. The method of claim 43,
wherein the instruction floating-point input operand has a single sign bit, an M-bit exponent, and an N-bit significand, wherein the intermediate result includes a first single bit field, a second M-bit field, and a third N-bit field;
wherein said executing the first microinstruction comprises executing the first microinstruction to generate the intermediate result such that when the exponent represents $2^{(N-1)}$, the significand is all binary ones, the sign bit is negative, and the rounding mode indicates round in the direction of negative infinity:
the first field bit is the instruction floating-point input operand sign bit;
the second field is the instruction floating-point input operand exponent unchanged; and
the third field is an N-bit rounded two's complement integer value converted from the instruction floating-point input operand;
wherein the instruction floating-point result has a single sign bit, an M-bit exponent, and an N-bit significand;
wherein said executing the second microinstruction comprises executing the first microinstruction to generate the instruction floating-point result such that when the second field represents $2^{(N-1)}$, the execution unit considers the first field bit appended as a most significant bit to the third field to be an integer value and converts the integer value to the instruction floating-point result.

Signed and Sealed this
Twenty-first Day of May, 2013

Teresa Stanek Rea
*Acting Director of the United States Patent and Trademark Office*

(12) United States Patent
Elmer et al.

(10) Patent No.: US 8,386,755 B2
(45) Date of Patent: Feb. 26, 2013

(54) NON-ATOMIC SCHEDULING OF MICRO-OPERATIONS TO PERFORM ROUND INSTRUCTION

(75) Inventors: Tom Elmer, Austin, TX (US); Terry Parks, Austin, TX (US)

(73) Assignee: VIA Technologies, Inc., New Taipei (TW)

(*) Notice: Subject to any disclaimer, the term of this patent is extended or adjusted under 35 U.S.C. 154(b) by 548 days.

(21) Appl. No.: 12/783,769

(22) Filed: May 20, 2010

(65) Prior Publication Data
US 2011/0029760 A1    Feb. 3, 2011

Related U.S. Application Data

(60) Provisional application No. 61/229,040, filed on Jul. 28, 2009.

(51) Int. Cl.
G06F 7/38     (2006.01)
G06F 9/00     (2006.01)
G06F 9/44     (2006.01)
G06F 15/00    (2006.01)

(52) U.S. Cl. ............................................. 712/222
(58) Field of Classification Search .................. None
See application file for complete search history.

(56) References Cited

U.S. PATENT DOCUMENTS

| | | | |
|---|---|---|---|
| 7,689,641 B2 * | 3/2010 | Abel et al. | 708/620 |
| 2004/0267857 A1 * | 12/2004 | Abel et al. | 708/524 |
| 2005/0125476 A1 * | 6/2005 | Symes et al. | 708/524 |
| 2007/0038693 A1 * | 2/2007 | Jacobi et al. | 708/446 |

* cited by examiner

Primary Examiner — Corey S Faherty
(74) Attorney, Agent, or Firm — E. Alan Davis; James W. Huffman

(57) ABSTRACT

A microprocessor executes an instruction specifying a floating-point input operand having a predetermined size and that instructs the microprocessor to round the floating-point input operand to an integer value using a rounding mode and to return a floating-point result having the same predetermined size. An instruction translator translates the instruction into first and second microinstructions. An execution unit executes the first and second microinstructions. The first microinstruction receives as an input operand the instruction floating-point input operand and generates an intermediate result from the input operand. The second microinstruction receives as an input operand the intermediate result of the first microinstruction and generates the floating-point result of the instruction from the intermediate result. The intermediate result is the same predetermined size as the instruction floating-point input operand. The microprocessor executes the first and second microinstructions such that the commencement of their executions may have indeterminate separation in time.

48 Claims, 9 Drawing Sheets